(12) United States Patent
Masalkar

(10) Patent No.: US 7,874,495 B2
(45) Date of Patent: Jan. 25, 2011

(54) REDUCING A VISIBLE PRESENCE OF AN OPTICALLY READABLE TAG

(75) Inventor: Prafulla Masalkar, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 30 days.

(21) Appl. No.: 12/030,841

(22) Filed: Feb. 13, 2008

(65) Prior Publication Data

US 2009/0200384 A1  Aug. 13, 2009

(51) Int. Cl.
G06K 19/06 (2006.01)
G06K 7/10 (2006.01)

(52) U.S. Cl. .................................. 235/494; 235/454

(58) Field of Classification Search ............... 235/447, 235/454, 468, 494; 359/359, 360, 361
See application file for complete search history.

(56) References Cited

U.S. PATENT DOCUMENTS

| | | | |
|---|---|---|---|
| 4,605,846 A * | 8/1986 | Duret et al. ............... 235/468 |
| 5,745,173 A | 4/1998 | Edwards et al. | |
| 6,509,559 B1 | 1/2003 | Ulrich et al. | |
| 6,554,452 B1 | 4/2003 | Bourn et al. | |
| 6,581,839 B1 * | 6/2003 | Lasch et al. ............... 235/487 |
| 6,603,103 B1 | 8/2003 | Ulrich et al. | |
| 6,634,552 B2 | 10/2003 | Smith et al. | |
| 6,650,022 B1 | 11/2003 | Qi et al. | |
| 7,204,428 B2 | 4/2007 | Wilson | |
| 2004/0130771 A1 * | 7/2004 | Carlson ............... 359/244 |
| 2006/0091333 A1 | 5/2006 | Cochran et al. | |
| 2007/0008595 A1 * | 1/2007 | Watanabe et al. ............... 359/2 |
| 2007/0125863 A1 | 6/2007 | Jakoboski et al. | |

OTHER PUBLICATIONS

Boukraa, et al., "Tag-Based Vision: Assisting 3d Scene Analysis with Radio-Frequency Tags", 2002, IEEE, pp. I 269-I 272.
Hollows, "Infrared Cameras Enhance Machine-Vision Systems", 2007, PennWell Corporation, pp. 1-4.
Poling, "Designing a Machine-Vision System", SPIE's oemagazine, 2002, pp. 34-37.

* cited by examiner

Primary Examiner—Thien M Le
(74) Attorney, Agent, or Firm—Alleman Hall McCoy Russell & Tuttle LLP

(57) ABSTRACT

Various embodiments of substantially visibly transparent optically readable tags are disclosed. In one disclosed embodiment, a tag formed on a substrate comprises a first bit value structure that comprises a higher reflectance than transmittance at one or more infrared wavelengths and a higher transmittance than reflectance at one or more visible wavelengths, and a second bit value structure that comprises a higher absorbance than transmittance at one or more infrared wavelengths and a higher transmittance than absorbance at one or more visible wavelengths.

20 Claims, 4 Drawing Sheets

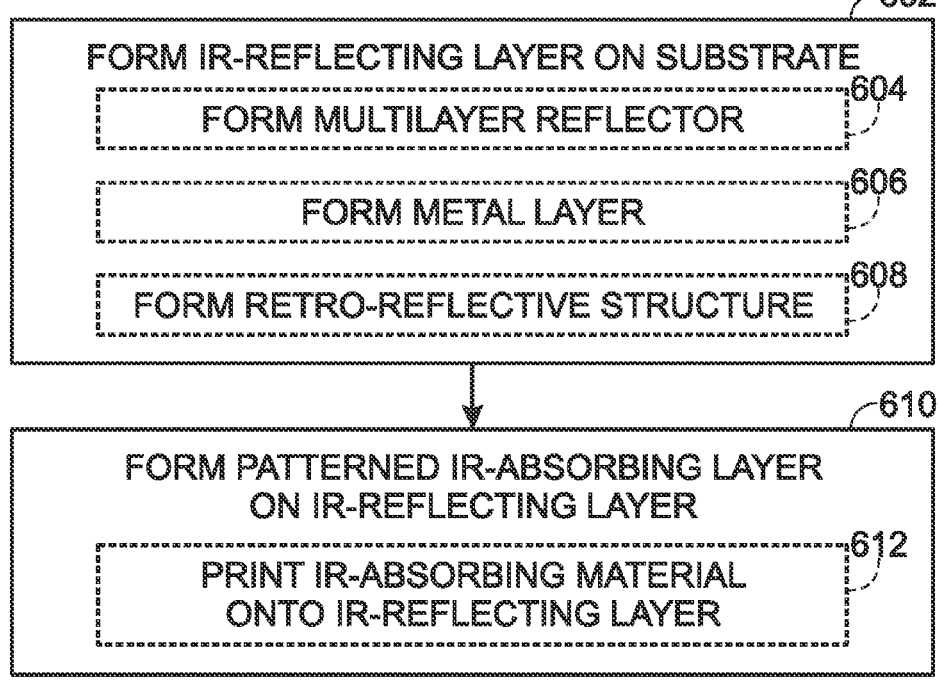
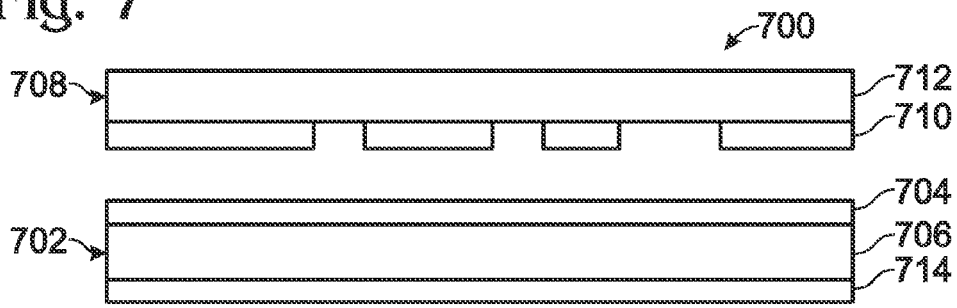
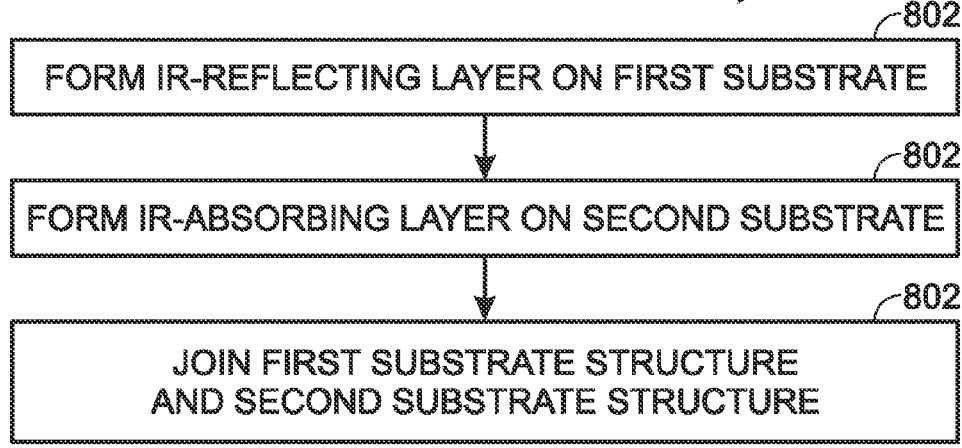

REDUCING A VISIBLE PRESENCE OF AN OPTICALLY READABLE TAG

BACKGROUND

Optically readable tags encode data in an optically readable format, and allow machine vision systems to identify objects associated with tags. Some optically readable tags, such as bar codes, are considered to be one-dimensional in that the tags encode information in a format that can be read via a scan along one direction. Other tags are considered to be two-dimensional in that the tags encode information along two directions.

Optically readable tags generally comprise regions of highly contrasting optical appearance, such as black and white regions, that represent different values. The use of such optically contrasting regions permits a machine vision system to read a tag more easily compared to tags with less contrast. However, the tag appearance may also detract from the aesthetics of an object that carries the tag.

SUMMARY

Accordingly, various embodiments of substantially visibly transparent optically readable tags are disclosed herein. For example, one embodiment comprises a first bit value structure comprising a higher reflectance than transmittance at one or more infrared wavelengths and a higher transmittance than reflectance at one or more visible wavelengths, and a second bit value structure that comprises a higher absorbance than transmittance at one or more infrared wavelengths and a higher transmittance than absorbance at one or more visible wavelengths.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 shows a flow diagram of an embodiment of a method for making an optically readable tag.

FIG. 7 shows a partially exploded, schematic sectional view of another embodiment of an optically readable tag.

FIG. 8 shows a flow diagram of another embodiment of a method for making an optically readable tag.

DETAILED DESCRIPTION

Figure 1:
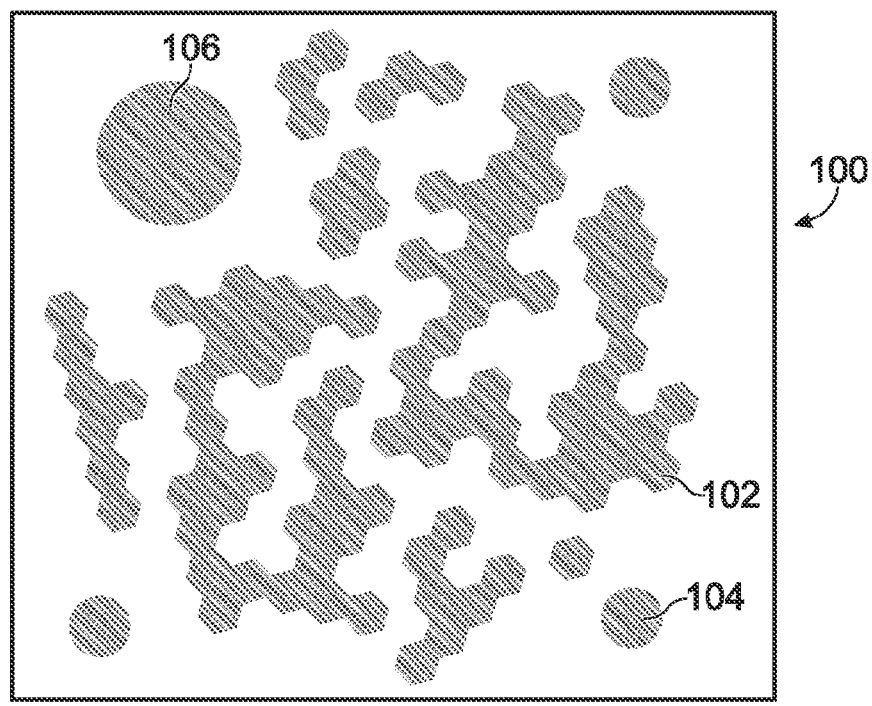
FIG. 1 shows an embodiment of a substantially visibly transparent optically readable tag.

FIG. 1 shows a first embodiment of an optically readable tag 100. The tag 100 comprises a plurality of data features 102 in the form of small, hexagonal regions each having one of two optically contrasting appearances that specify a first bit value and a second bit value. The tag 100 also comprises orientation features 104 that allow a machine vision system to determine the orientation of the tag 100 before reading the data features 102, and a low resolution tracking feature 106 that allows motion of the tag 100 to be tracked at speeds that may cause the data features 102 to appear blurry to a machine vision system. It will be understood that the depicted tag 100 is shown for the purpose of example, and that the concepts disclosed herein may be used with any other suitable optically readable tag. Further, while the depicted embodiment is described as having a first bit value and a second bit value, it will be understood that an optically readable tag as disclosed herein may have data features that encode more than two different bit values. Additionally, it will be understood that the term "tag" may represent any of a stand-alone item that can be affixed or adhered to another object, a code or pattern printed directly onto an object (such as a barcode printed directly onto a product), or any other form of optically readable indicia that encodes a value.

The tag 100 is configured such that the appearances of both the first bit value and the second bit value are substantially transparent to visible light but have high contrast relative to one another at one or more infrared wavelengths. The term "substantially transparent" as used herein may refer to a tag in which the first bit value comprises a higher reflectance than transmittance at one or more infrared wavelengths and a higher transmittance than reflectance at one or more visible wavelengths, and in which the second bit value comprises a higher absorbance than transmittance at one or more infrared wavelengths and a higher transmittance than absorbance at one or more visible wavelengths. Such a tag may have less of a visually detrimental impact on the item to which it is affixed than other optically readable tags, yet have sufficient contrast at desired infrared wavelengths to be read by an optical detector.

The first and second bit values may be configured to be readable at any suitable non-visible wavelength. For example, in some embodiments, the first and second bit values may be configured to be readable at near-infrared wavelengths of approximately 750-1500 nanometers. In a more specific embodiment, the first and second bit values are configured to be readable at approximately 850 nanometers. In other embodiments, the first and second bit values may be configured to be read at infrared wavelengths outside of this range.

Figure 2:
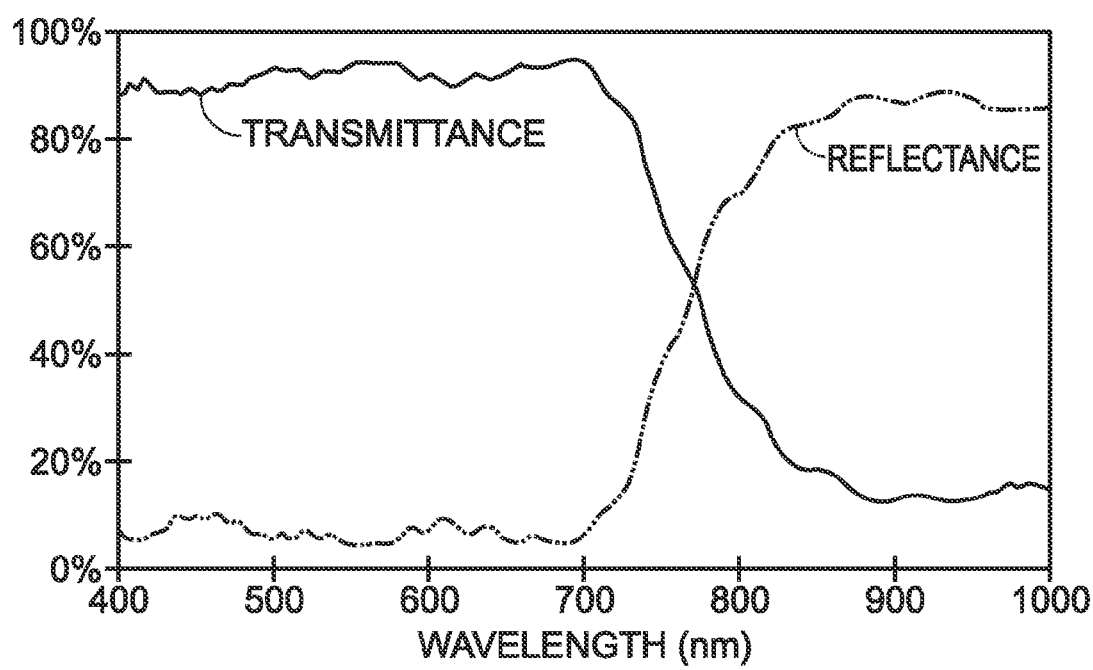
FIG. 2 shows a graphical representation of a reflectance and transmittance of an example multilayer dielectric reflector.

Any suitable materials and/or structures of materials may be used to give the first bit values and second bit values an optically distinguishable appearance at a desired wavelength. For example, materials may be selected such that the first bit value is highly reflecting at desired infrared wavelengths while the second bit value is highly absorbing at desired infrared wavelengths, and such that both transmit a substantial portion of visible light. For example, the first bit value may be formed from a multilayer dielectric thin film optical interference coating. A multilayer dielectric reflector comprises alternating quarter wavelength-thick layers of a high refractive index material and a low refractive index material, wherein a number of layers used may be selected for desired bandwidth and reflectivity. FIG. 2 shows a transmission and reflection profile for an example multilayer reflective structure configured for use at wavelengths of approximately 850 nm, where the layers have a thickness of approximately 0.15 microns. In this figure it can be seen that the transmittance of the film is close to 100% in the visible wavelengths, but drops off to approximately 10-15% at wavelengths of >800 nm, while the reflectance increases to approximately 85-90% in this region. Such a multilayer film may therefore allow the formation of a first bit value structure that is essentially transparent to visible light while highly reflective at desired infrared wavelengths.

Any suitable materials may be used to form the multilayer film. Examples of suitable high refractive index materials comprise zinc sulphide and niobium oxide, and examples of suitable low refractive index materials comprise silicon dioxide and sodium hexafluoroaluminate. It will be understood that these specific materials are disclosed for the purpose of example, and that any other suitable materials may be used.

Figure 3:
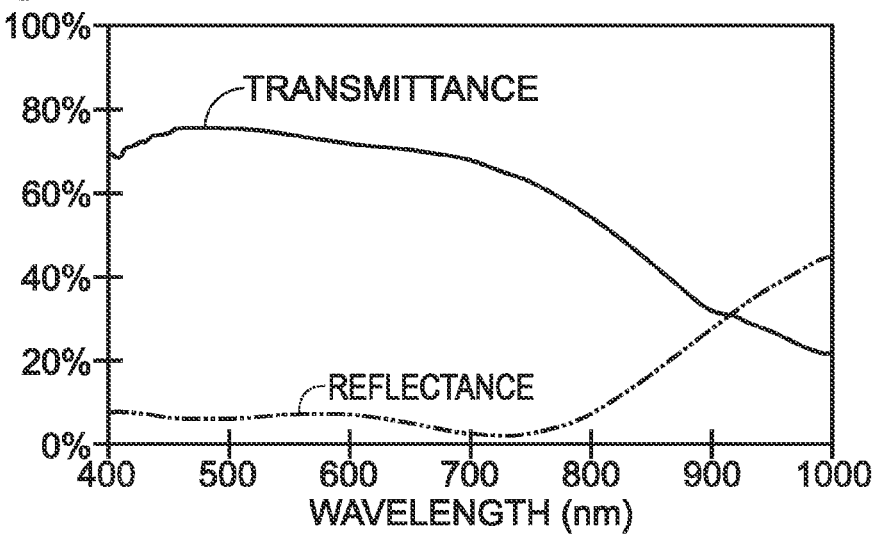
FIG. 3 shows a graphical representation of a reflectance and transmittance of an example metallic film.

In another embodiment, a metallic film is used to give the first bit value a reflective appearance at infrared wavelengths. The metallic film may be configured to be sufficiently thin that a majority of visible light passes through the film while providing an acceptable reflectivity to desired infrared wavelengths. FIG. 3 shows a reflection and transmission profile for a thin (50 nm-200 nm) chromium film at visible and near-infrared wavelengths. As can be seen in the figure, such a film transmits a large majority of visible light (e.g. approximately 70-80%) across the visible wavelengths, and then tapers down to approximately 20-25% transmission at longer wavelengths, while the reflectivity increases in a corresponding manner. Therefore, such a film may provide an acceptably high reflectivity at desired infrared wavelengths and an acceptably high transmissivity at visible wavelengths. While the depicted example shows a reflection/transmission profile of a thin chromium film, it will be appreciated that any other suitable metallic film may be used. Examples include, but are not limited to, silver and aluminum.

In yet another embodiment, a reflective first bit value may be formed from a retro-reflective structure that is embossed, molded, or otherwise formed on a film. Such a structure may comprise, for example, microprisms or microbeads configured to reflect incident light in a direction parallel to the direction of incidence. Yet other embodiments may utilize any other suitable structure that reflects infrared (or other desired non-visible) wavelengths while transmitting a substantial portion of visible light.

The material and/or structure used to represent the second bit value may be configured to be strongly absorbing at the wavelengths at which the first bit value is reflective. In some embodiments in which the tag is configured to be readable at infrared wavelengths, the base film on which the reflective first bit value structure is formed may be configured to have low reflectivity. For example, where a a PET (polyethylene terephthlate) or acrylate film is used as a substrate, the substrate may be sufficiently non-reflective that the first and second bit values may be formed by patterning a reflective structure directly onto the substrate.

If more contrast between the first and second bit values is desired, the second bit value may be formed from a material that strongly absorbs in the wavelength region at which the tag is to be read. For example, where the tag is configured to be readable at infrared wavelengths, the second bit value may be formed from an infrared-absorbing dye or pigment. In the specific embodiment of a tag configured to be read with infrared light of approximately 850 nm, an example of a suitable dye is DT2-74 Å made by Epolin Corporation of Newark, N.J.

Figure 4:
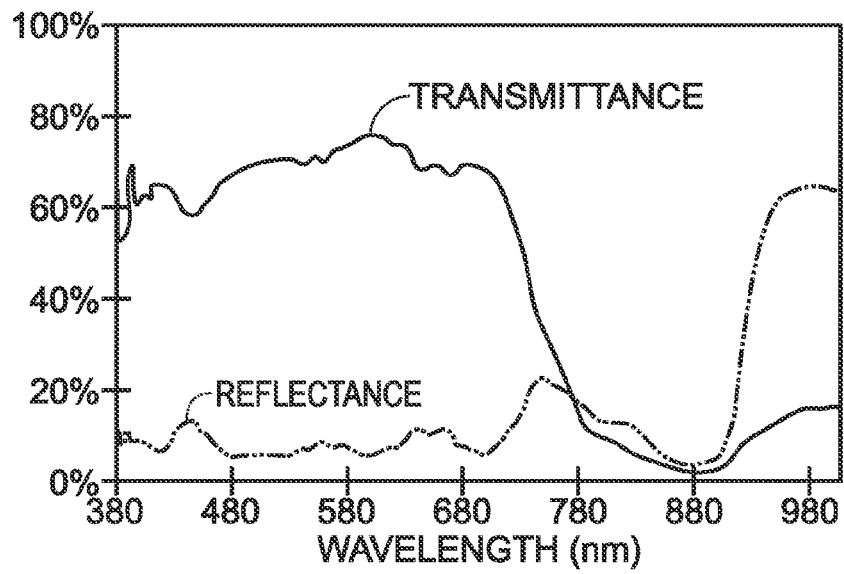
FIG. 4 shows a graphical representation of a reflectance and transmittance of an example IR absorbing material.

The transmittance and reflectance spectrum of an example of this dye is shown in FIG. 4. In this figure, it can be seen that the reflectance is low for wavelengths smaller than about 880 nm. Further, the transmittance is high at visible wavelengths but low about a desired infrared wavelength range (e.g. 780-880 nm range). The absorbance is high in the regions where both the transmittance and reflectance are low, which indicates a wavelength region at which the dye appears dark to an image sensor. Alternatively or additionally, any other suitable dye or pigment may be used.

Careful selection and formation of the reflective and absorbing materials may permit use of first bit value materials and second bit value materials having high reflectance and high absorbance, respectively, at similar wavelengths. This may permit the construction of a tag that is substantially visibly transparent and that has high contrast at desired non-visible wavelengths.

Figure 5:
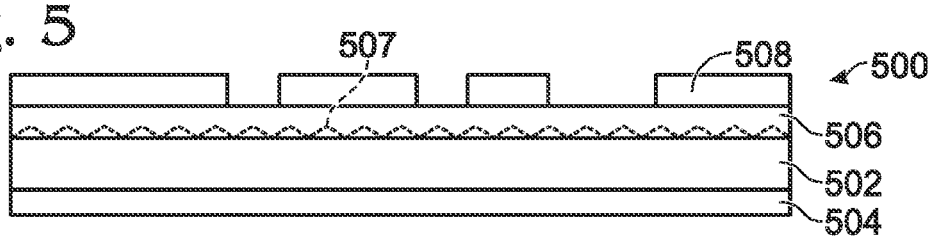
FIG. 5 shows a schematic sectional view of an embodiment of an optically readable tag.

The materials used to form the first and second bit values may be formed or deposited in any suitable manner. In some embodiments, both reflecting and absorbing materials may be deposited on a single substrate. As an example of such an embodiment, an infrared-reflecting material may be deposited on a visibly transparent substrate, and an infrared-absorbing dye or pigment may be deposited onto the infrared-reflecting material. FIG. 5 shows an example of a tag 500 formed by this order of processes. The tag 500 comprises a base substrate 502 that may include an adhesive backing 504 that allows the tag to be adhered to an object. The tag 500 further comprises a first bit value structure 506 in the form of an infrared-reflecting layer formed on the substrate on an opposite face as the adhesive backing 504 comprising a suitable adhesive such as an optical pressure-sensitive adhesive. The first bit value structure also may comprise an embossed or molded retro-reflective structure, as shown at 507. The retro-reflective structure 507 is shown formed on layer 506, but also may be formed directly on substrate 502, in which case layer 506 may be omitted. The tag 500 further comprises a second bit value 508 structure patterned on the first bit value structure 506. In an alternate embodiment, the substrate 502 is an object on which the first and second bit value structures are formed such that the tag 500 is directly formed on an object, rather than affixed to an object with adhesive.

FIG. 6 shows a high-level flow diagram depicting a method 600 of forming the tag 500. First, as indicated at 602, an infrared-reflecting layer is formed on a substrate to represent a first bit value. This step may comprise forming an optical interference coating, as indicated at 604; a metallic layer, as indicated at 606; and/or a retro-reflective structure, as indicated at 608. The infrared-reflecting layer may be formed in any suitable manner. For example, where the infrared-reflecting layer comprises an optical interference coating, the infrared-reflecting layer may be formed by depositing alternating layers of a high refractive index material and a low refractive index material, as described above, to form a reflective multilayer film. Depending upon the materials used, these layers may be formed by sputtering, evaporation, CVD, PVD, or other suitable technique. Likewise, a metallic layer may be formed in a similar manner. Where the first bit value structure comprises a retro-reflective structure, the structure may be embossed or molded into a face of layer 506, or even directly onto base film 502. It will be understood that the specific materials, structures and deposition methods disclosed above for the infrared-reflective layer are described for the purpose of example, and are not intended to be limiting in any manner.

The infrared-reflecting layer formed at 602 may be formed as a generally continuous structure extending the dimensions of the substrate. Next, at 610, method 600 comprises forming a patterned infrared-absorbing layer on the previously-formed infrared-reflecting layer. The infrared-absorbing layer may be patterned onto the infrared-reflecting layer in any suitable manner. For example, as shown at 612, the infrared-absorbing layer may be printed onto the infrared-reflecting layer via screen printing, inkjet printing, or any other suitable printing technique. Alternatively, a method other than printing may be used to form the infrared-absorbing layer.

The infrared-absorbing layer is patterned on the infrared-reflecting layer in such a manner to form an array of machine-readable data bits, thereby allowing the tag to encode a machine-readable value. The use of appropriate materials for the infrared-absorbing and infrared-reflecting layers allows high optical contrast to be achieved at desired infrared wavelengths while maintaining a substantially visually transparent appearance.

Continuing with the Figures, FIG. 7 shows a partially exploded schematic view of another embodiment of an optically readable tag 700. In contrast to the embodiment of FIG. 5 in which the first bit value structure and the second bit value structure are formed on a single substrate, the embodiment of FIG. 7 comprises separate substrates on which the first bit value structure and the second bit value structure are formed. Referring to FIG. 7, a first substrate structure 702 comprises a first bit value structure 704 formed on a first substrate 706, and a second substrate structure 708 comprises a second bit value structure 710 formed on a second substrate 712. Further, a layer 714 of a pressure sensitive adhesive or the like may be disposed on the first substrate to allow the tag 700 to be affixed to an object. The first substrate structure 702 and the second substrate structure 708 may be joined in a face-to-face arrangement such that the first bit value structure 704 and the second bit value structure 710 are sandwiched between the first substrate 706 and the second substrate 712. This arrangement may provide a measure of protection against damage to the first bit value structure 704 and the second bit value structure 710 from scratching, abrasion and the like.

FIG. 8 shows a flow diagram depicting an embodiment of a method 800 for forming tag 700. First, at 802, method 800 comprises forming an infrared-reflecting layer on a first substrate to form a first substrate structure. Additionally, at 804, method 800 comprises forming an infrared-absorbing layer on a second substrate to form a second substrate structure. Then, at 806, method 800 comprises joining the first substrate structure and the second substrate structure to form a tag.

Where printing is used to form the infrared-absorbing layer, running of the printed dye may be reduced by increasing viscosity of the printing ink or a higher screen mesh size. However, this may increase the thickness of the infrared-absorbing layer, and therefore may increase the visibility of the layer to some degree. To allow use of a less viscous ink and a smaller printing screen mesh size, a surface of the second substrate may be given a slight texture to help prevent running. This may allow the use of a thinner ink, and therefore may produce a less visible infrared-absorbing film. Likewise, visibility of the infrared-absorbing film may be affected by the concentration of the infrared-absorbing species in an ink solution, wherein higher concentrations may be more visible and lower concentrations may be less visible.

Figure 9:
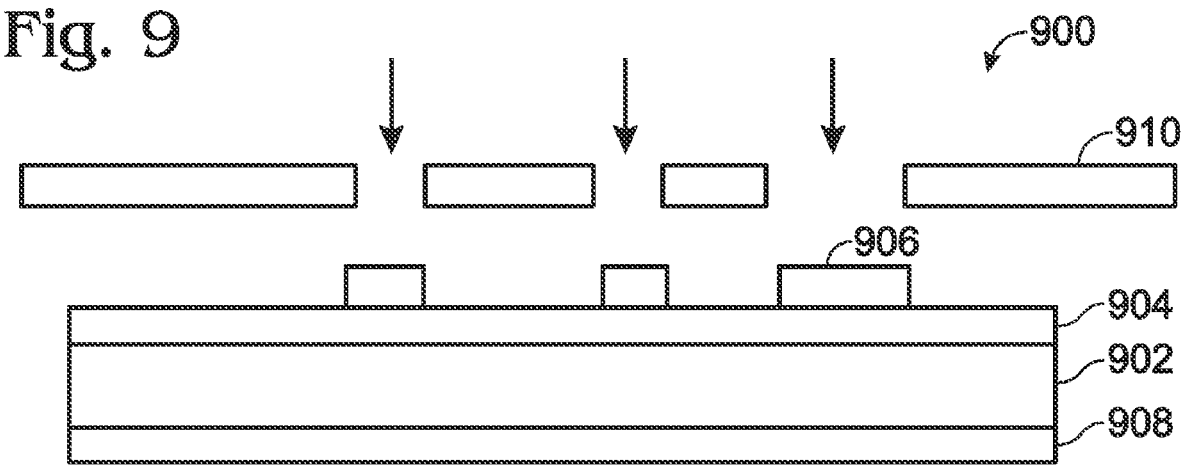
FIG. 9 shows a schematic sectional view of another embodiment of an optically readable tag.

Referring briefly back to FIGS. 5 and 7, the infrared-reflecting layers are each shown as being continuous, while the infrared-absorbing layers are shown as being patterned. However, in other embodiments, the infrared-reflecting layer may be substantially continuous and the infrared-absorbing layer may be patterned. FIG. 9 shows an embodiment of a tag 900 comprising a substrate 902, a continuous infrared-absorbing layer that forms a first bit value structure 904, a patterned infrared-reflecting layer that forms a second bit value structure 906, and an adhesive backing layer 908. FIG. 9 also shows a schematic representation of a shadow mask 910 used to pattern the first bit value structure 904 during a sputtering, evaporation, or other vapor-phase deposition of the first bit value structure. While FIG. 9 shows the first bit value structure 906 and the second bit value structure 906 formed on a single substrate, it will be understood that the first bit value structure 904 and second bit value structure 906 may be formed on separate substrates as discussed above in the context of FIGS. 7-8. Likewise, where the substrate is sufficiently non-reflective at the desired infrared wavelengths, the substrate itself may comprise the second bit value structure.

Figure 10:
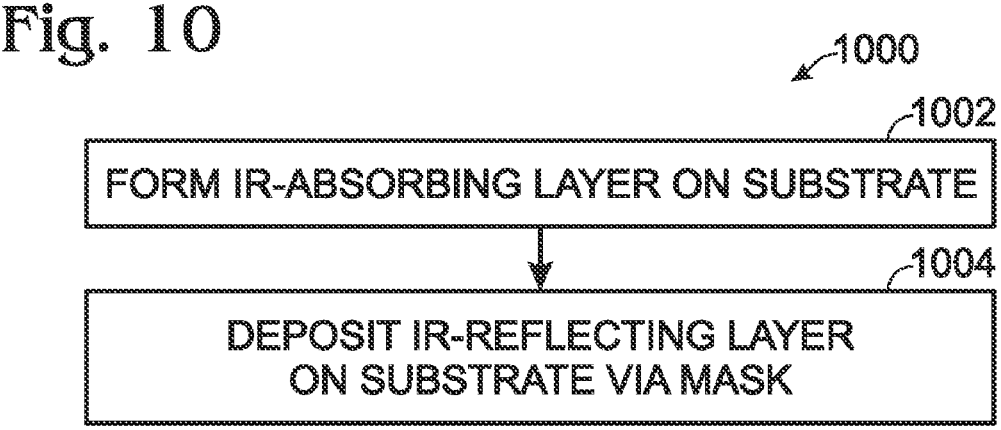
FIG. 10 shows a flow diagram of another embodiment of a method for making an optically readable tag.

FIG. 10 shows a flow diagram depicting an embodiment of a method 1000 for forming tag 900. Method 1000 first comprises, at 1002, forming a continuous infrared-absorbing layer on a substrate, and then, at 1004, depositing a patterned infrared-reflecting layer on the infrared-absorbing layer via a mask as illustrated in FIG. 9. Alternatively, depending upon the material or materials used for the infrared-reflecting layer, the infrared-reflecting layer may be patterned in another manner, for example, via printing or even an etching process. Further, while method 1000 shows the infrared-absorbing layer and the infrared-reflecting layers as being formed on the same substrate, in other embodiments these layers may be formed on separate substrates and then combined to produce a substantially visibly transparent tag.

It will be understood that various embodiments of tags according to the present disclosure may have additional layers or structures not disclosed herein, such as protective coatings, ultraviolet-absorbing layers to prevent degradation due to sunlight, and other such additional layers. Further, while each of the embodiments described herein comprises one bit value structure formed from a continuous film and another bit value structure formed from a patterned film, in other embodiments both bit value structures may be patterned.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A substantially visibly transparent optically readable tag formed on a substrate, the tag comprising:
   an array of machine-readable data bits, each data bit having one of two or more optically contrasting appearances, wherein one of the two or more optically contrasting appearances is defined by a first bit value structure comprising a higher reflectance than transmittance at one or more infrared wavelengths greater than 750 nm and a higher transmittance than reflectance at visible wavelengths less than 750 nm, the first bit value structure having a transmittance of at least 60% for visible wavelengths less than 750 nm; and wherein another of the two or more optically contrasting appearances is defined by a second bit value structure comprising a higher absorbance than transmittance at one or more infrared wavelengths greater than 750 nm and a higher transmittance than absorbance at visible wavelengths less than 750 nm such that all data bits have a higher transmittance at visible wavelengths less than 750 nm than at the one or more infrared wavelengths greater than 750 nm.

2. The optically readable tag of claim 1, wherein the first bit value structure is disposed on the substrate, and wherein the second bit value structure is disposed on the first bit value structure.

3. The optically readable tag of claim 1, wherein the second bit value structure is disposed on the substrate, and wherein the first bit value structure is disposed on the second bit value structure.

4. The optically readable tag of claim 1, further comprising a protective layer covering the first bit value structure and the second bit value structure.

5. The optically readable tag of claim 1, wherein the first bit value structure comprises one or more of a multilayer dielectric reflector, a metallic film, and a retro-reflective structure.

6. The optically readable tag of claim 1, wherein the second bit value structure is the substrate.

7. The optically readable tag of claim 1, wherein the second bit value structure comprises a dye configure to absorb infrared light while transmitting visible light.

8. The optically readable tag of claim 1, further comprising an adhesive layer disposed on the substrate.

9. The optically readable tag of claim 1, wherein the first bit value structure and the second bit value structure are configured to be substantially transparent at visible wavelengths less than 750 nm.

10. A method for producing an optically readable tag, comprising:
    forming an array of machine-readable data bits comprising a first bit value structure and a second bit value structure, wherein the first bit value structure comprises a higher reflectance than transmittance at one or more infrared wavelengths greater than 750 nm, and a higher transmittance than reflectance at visible wavelengths less than 750 nm, the first bit value structure having a transmittance of at least 60% for visible wavelengths less than 750 nm; and
    wherein the second bit value structure comprises a higher absorbance than transmittance at one or more infrared wavelengths greater than 750 nm and a higher transmittance than absorbance at visible wavelengths less than 750 nm such that all data bits have a higher transmittance at visible wavelengths less than 750 nm than at the one or more infrared wavelengths greater than 750 nm.

11. The method of claim 10, wherein the first bit value structure is formed on a substrate, and then the second bit value structure is patterned on the first bit value structure.

12. The method of claim 10, wherein the second bit value structure is formed on a substrate, and then the first bit value structure is patterned on the second bit value structure.

13. The method of claim 10, wherein the first bit value structure is formed on a first substrate and the second bit value structure is formed on a second substrate, and wherein the first and second substrates are joined such that the first and second substrates sandwich the first bit value structure and the second bit value structure.

14. The method of claim 10, wherein forming the first bit value structure comprises forming a multilayer dielectric reflector.

15. The method of claim 10, wherein forming the first bit value structure comprises forming a metal film.

16. The method of claim 10, wherein forming the second bit value structure comprises printing a pattern of an infrared-absorbing material onto the first bit value structure.

17. The method of claim 10, wherein forming the second bit value structure comprises forming a layer of an infrared-absorbing material.

18. A method for producing an optically readable tag, comprising:
    forming over a visibly transparent substrate a first bit value structure with a higher reflectance than transmittance at one or more infrared wavelengths greater than 750 nm, and a higher transmittance than reflectance at visible wavelengths less than 750 nm, the first bit value structure having a transmittance of at least 60% for visible wavelengths less than 750 nm; and
    forming over the first bit value structure a patterned second bit value structure comprising a higher absorbance than transmittance at one or more infrared wavelengths greater than 750 nm and a higher transmittance than absorbance at visible wavelengths less than 750 nm, thereby forming an array of machine-readable bits such that all bits have a higher transmittance at visible wavelengths less than 750 nm than at the one or more infrared wavelengths greater than 750 nm.

19. The method of claim 18, wherein forming the first bit value structure comprises forming one or more of a multilayer dielectric reflector, a metallic layer, and a retro-reflective structure.

20. The method of claim 18, wherein forming the second bit value structure comprises printing an infrared-absorbing material onto the first bit value structure.

* * * * *